(12) United States Patent
Fahrbach

(10) Patent No.: US 11,561,384 B2
(45) Date of Patent: Jan. 24, 2023

(54) METHOD AND DEVICE FOR ADJUSTING THE FOCUS OR DETERMINING THE REFRACTIVE INDEX OF A SAMPLE MEDIUM, NON-VOLATILE COMPUTER-READABLE STORAGE MEDIUM AND MICROSCOPE

(71) Applicant: Leica Microsystems CMS GmbH, Wetzlar (DE)

(72) Inventor: Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 312 days.

(21) Appl. No.: 16/955,813

(22) PCT Filed: Dec. 21, 2018

(86) PCT No.: PCT/EP2018/086779
§ 371 (c)(1),
(2) Date: Jun. 19, 2020

(87) PCT Pub. No.: WO2019/122422
PCT Pub. Date: Jun. 27, 2019

(65) Prior Publication Data
US 2020/0341256 A1    Oct. 29, 2020

(30) Foreign Application Priority Data

Dec. 22, 2017  (DE) .................... 10 2017 223 787.2

(51) Int. Cl.
*G01J 3/02*       (2006.01)
*G02B 21/24*      (2006.01)
(Continued)

(52) U.S. Cl.
CPC ....... *G02B 21/245* (2013.01); *G01N 21/4133* (2013.01); *G02B 21/006* (2013.01); *G01N 2201/02* (2013.01)

(58) Field of Classification Search
CPC .... G02B 21/00; G02B 21/245; G02B 21/006; G02B 21/367; G02B 21/0032; G02B 21/06; G01N 21/4133; G01N 2201/02
See application file for complete search history.

(56) References Cited

U.S. PATENT DOCUMENTS

| | | |
|---|---|---|
| 5,306,902 A | 4/1994 | Goodman |
| 5,594,235 A | 1/1997 | Lee |

(Continued)

FOREIGN PATENT DOCUMENTS

| | | |
|---|---|---|
| DE | 102007039981 A1 | 2/2009 |
| DE | 102007045897 A1 | 4/2009 |

(Continued)

*Primary Examiner* — Abdullahi Nur
(74) *Attorney, Agent, or Firm* — Leydig, Voit & Mayer, Ltd.

(57) ABSTRACT

A method for adjusting a focus of an optical system includes focusing measurement light in a sample space using an optical arrangement. The measurement light is transmitted on a sample side of the optical arrangement through at least one optical medium. The measurement light reflected by a reflector and transmitted through a further optical arrangement is detected using a detector arrangement. A working distance between the optical arrangement and the reflector is ascertained based on the measurement light detected by the detector, wherein a focus of the measurement light lies on the reflector for the working distance.

18 Claims, 7 Drawing Sheets

(51) Int. Cl.
  *G01N 21/41*  (2006.01)
  *G02B 21/00*  (2006.01)

(56) References Cited

U.S. PATENT DOCUMENTS

| | | | | |
|---|---|---|---|---|
| 8,498,048 B2 * | 7/2013 | Wilson | ............... | G02B 21/241 |
| | | | | 359/383 |
| 2009/0051932 A1 | 2/2009 | Heiden et al. | | |
| 2010/0201784 A1 | 8/2010 | Lippert et al. | | |
| 2016/0320301 A1 | 11/2016 | Knebel et al. | | |
| 2017/0090176 A1 | 3/2017 | Pospiech et al. | | |
| 2017/0322409 A1 | 11/2017 | Pospiech et al. | | |
| 2018/0306714 A1 | 10/2018 | Bergter et al. | | |
| 2018/0329192 A1 * | 11/2018 | Walecki | ............... | G02B 21/244 |

FOREIGN PATENT DOCUMENTS

| | | |
|---|---|---|
| DE | 102011081192 A1 | 2/2013 |
| DE | 102012016316 A1 | 2/2014 |
| DE | 102013226277 A1 | 6/2015 |
| DE | 102015116452 A1 | 3/2017 |
| DE | 102015119258 A1 | 5/2017 |
| DE | 102016108226 A1 | 11/2017 |
| JP | H09-281384 A | 10/1997 |
| JP | 3602925 B2 | 12/2004 |
| JP | 2013108932 A | 6/2013 |

* cited by examiner

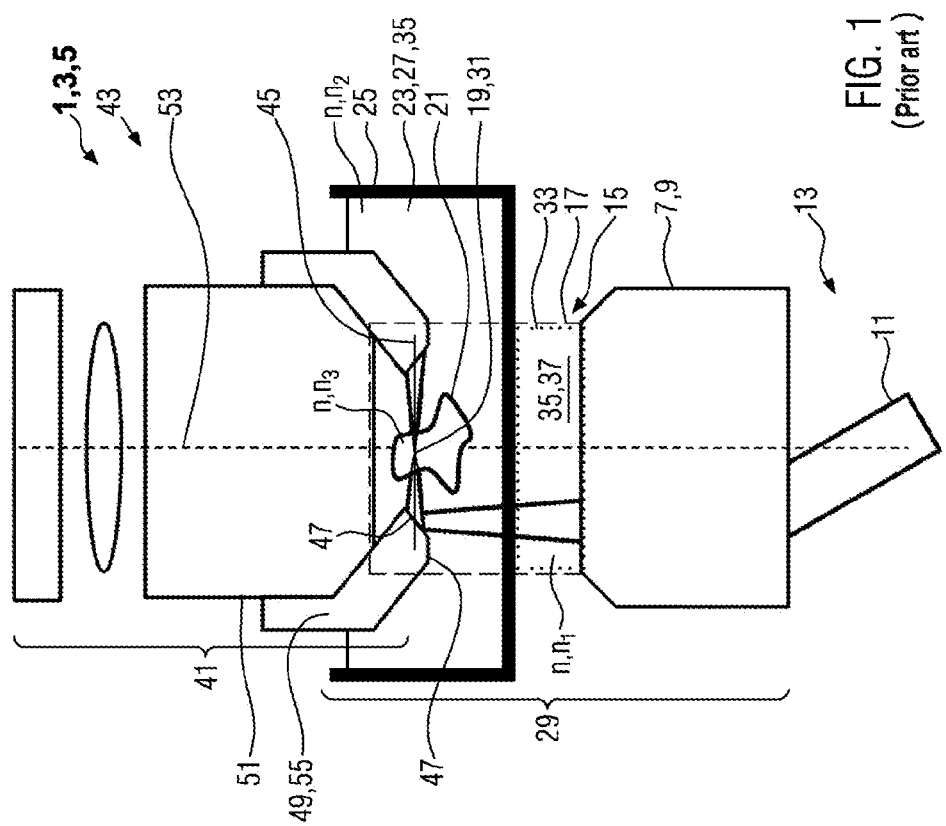

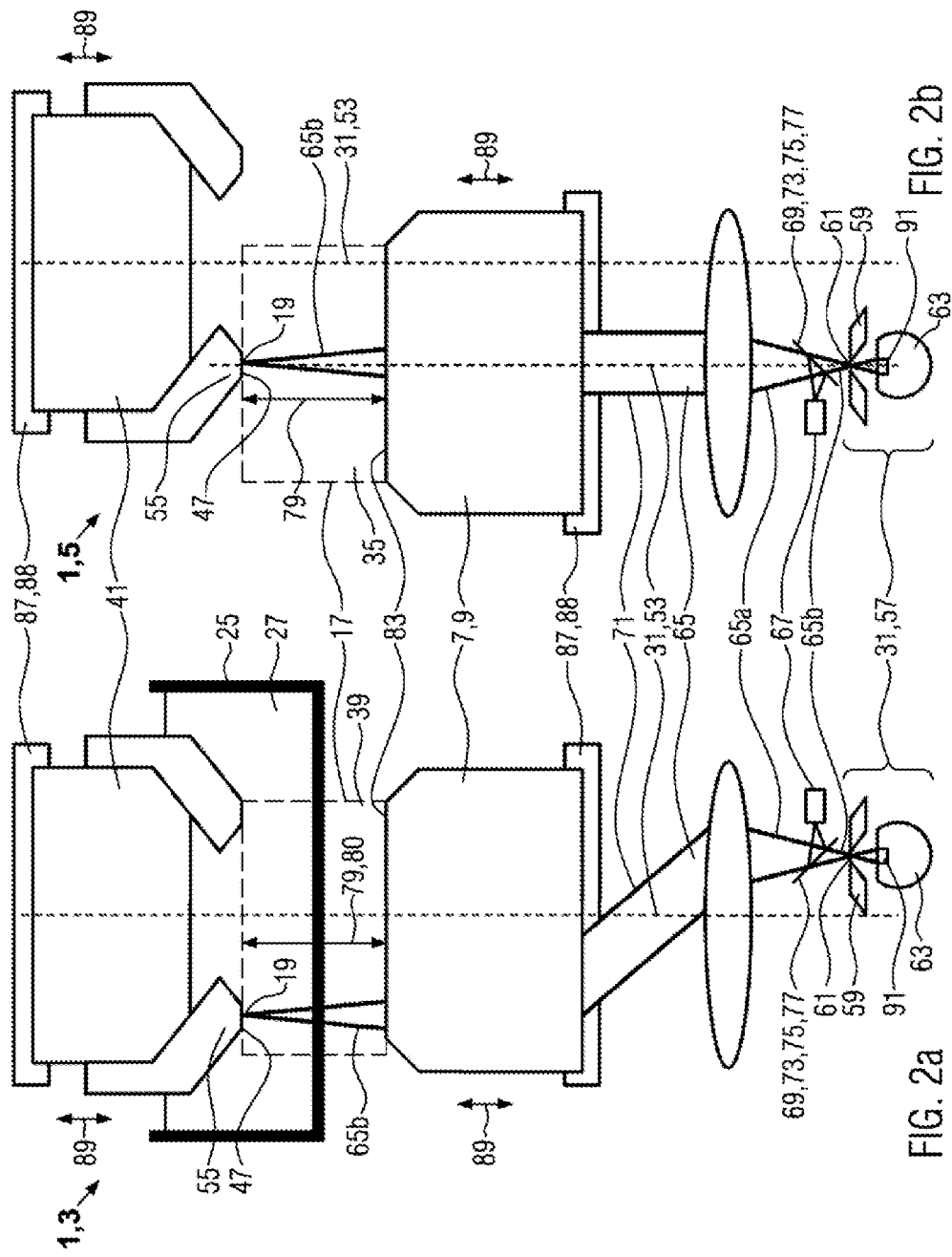

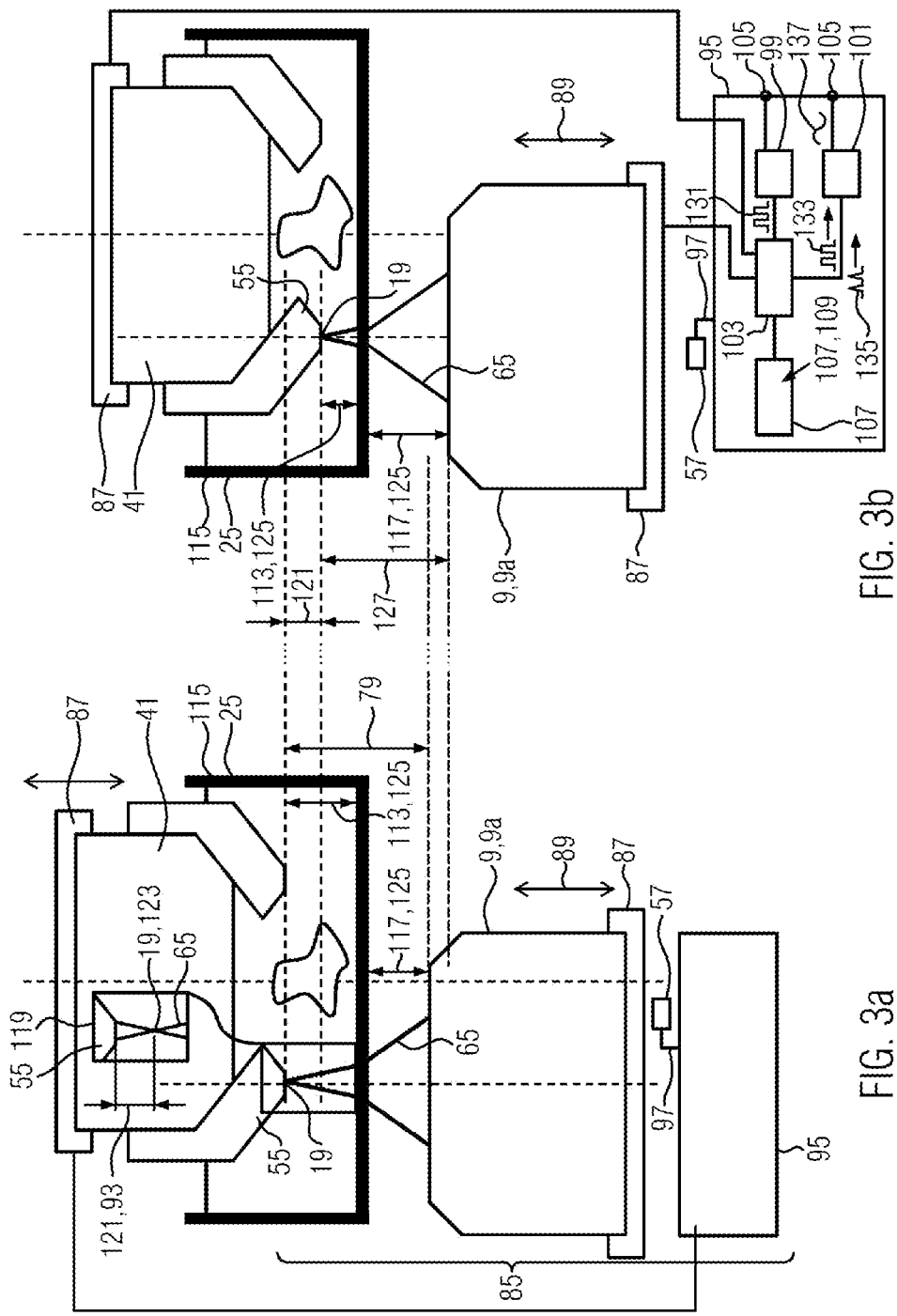

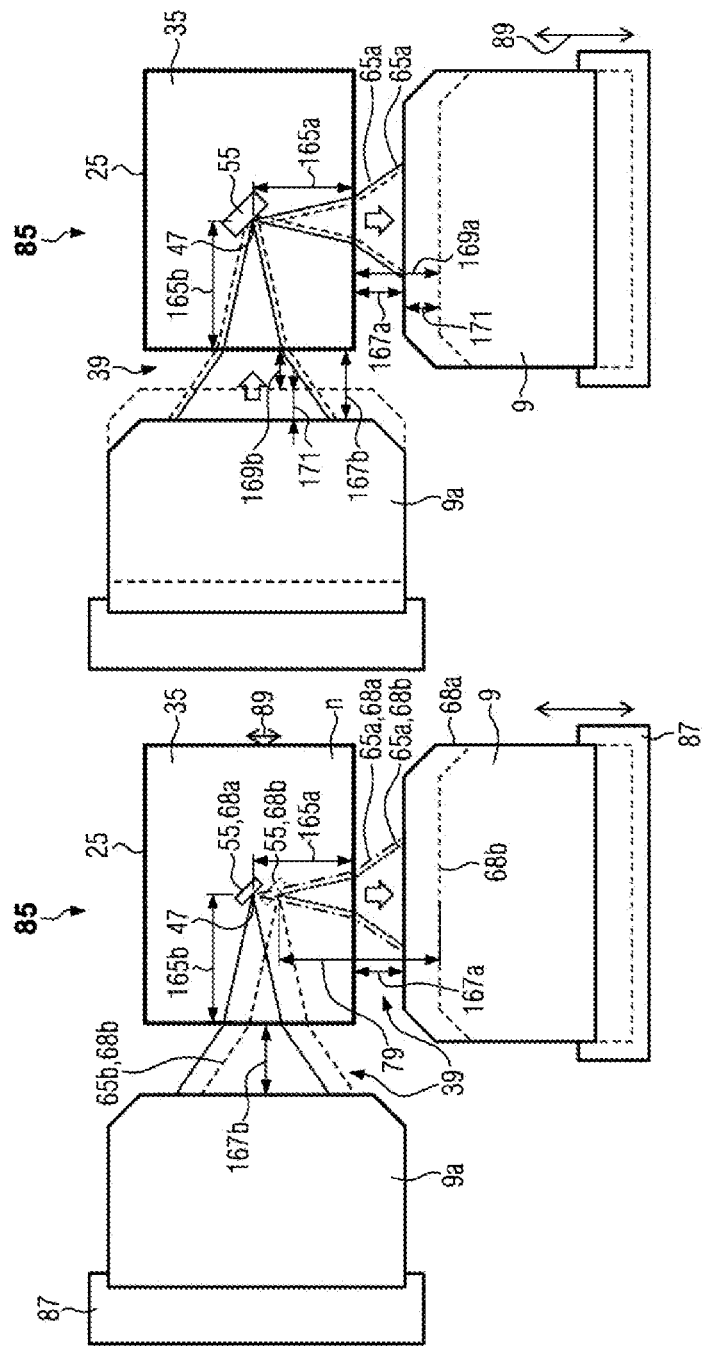

METHOD AND DEVICE FOR ADJUSTING THE FOCUS OR DETERMINING THE REFRACTIVE INDEX OF A SAMPLE MEDIUM, NON-VOLATILE COMPUTER-READABLE STORAGE MEDIUM AND MICROSCOPE

CROSS-REFERENCE TO PRIOR APPLICATIONS

This application is a U.S. National Phase Application under 35 U.S.C. § 371 of International Application No. PCT/EP2018/086779, filed on Dec. 21, 2018, and claims benefit to German Patent Application No. DE 10 2017 223 787.2, filed on Dec. 22, 2017. The International Application was published in German on Jun. 27, 2019 as WO 2019/122422 A1 under PCT Article 21(2).

FIELD

The present invention relates to a method and a device for adjusting the focus of an optical system, in particular of a microscope such as a confocal or light sheet microscope, to a method and a device for determining the refractive index of a sample medium arranged in the sample space, to a non-volatile computer-readable storage medium, and to a microscope, in particular a confocal or light sheet microscope.

BACKGROUND

Methods and devices for adjusting the focus or for determining the refractive index of a sample medium are known from the prior art. However, they have the disadvantage that they are slow, require a high illumination intensity or require the recording of an image, in particular an image of the sample.

Consequently, the prior art solutions require contrast in an object or in the illumination to adjust the focus or to ascertain a refractive index.

SUMMARY

In an embodiment, the present invention provides a method for adjusting a focus of an optical system. The method includes focusing measurement light in a sample space using an optical arrangement. The measurement light is transmitted on a sample side of the optical arrangement through at least one optical medium. The measurement light reflected by a reflector and transmitted through a further optical arrangement is detected using a detector arrangement. A working distance between the optical arrangement and the reflector is ascertained based on the measurement light detected by the detector, wherein a focus of the measurement light lies on the reflector for the working distance.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 1 shows a schematic illustration of a light sheet microscope from the prior art;

FIG. 2a and FIG. 2b show schematic illustrations of a microscope according to an embodiment of the invention;

FIG. 3a and FIG. 3b show a schematic illustration of the device according to an embodiment of the invention for determining the refractive index;

FIG. 3c and FIG. 3d show a schematic illustration of a further embodiment of the device according to the invention for determining the refractive index;

DETAILED DESCRIPTION

Figure 2D:
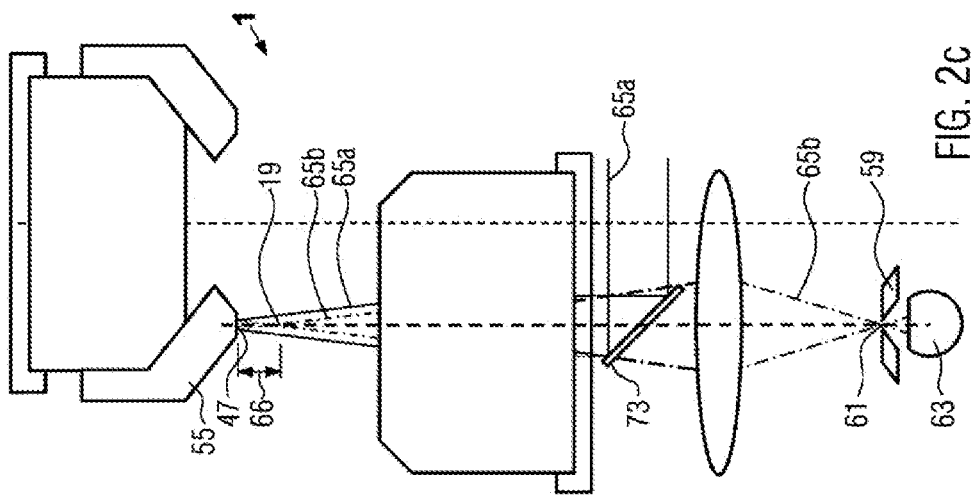
FIG. 2c and FIG. 2d show schematic illustrations of a further embodiment of the microscope according to the invention.

Embodiments of the present invention provide a method and a device for adjusting the focus or determining the refractive index of a sample medium that make simple and fast adaptation of an optical system, in particular of a microscope such as a confocal or light sheet microscope, to the conditions relating to the measurement possible or permit the quick and easy ascertainment of the refractive index of a sample medium without the need for a contrast in the object or the illumination.

The method according to an embodiment of the invention for adjusting the focus comprises the following method steps:

focusing measurement light in a sample space by way of an optical arrangement, wherein the measurement light is transmitted on a sample side of the optical arrangement by at least one medium;

detecting the measurement light that was reflected by a reflector and transmitted by a further optical arrangement using a detector arrangement; and ascertaining a working distance between the optical arrangement and the reflector on the basis of the measurement light detected by the detector, wherein the focus of the measurement light is located on the reflector for the working distance.

The method according to an embodiment of the invention for determining the refractive index of a sample medium achieves a solution to the abovementioned problem in that the sample medium is arranged with at least one further medium between the reflector and the optical arrangement, wherein:

a working distance is ascertained by way of the method steps of the method for adjusting the focus. (In other words, the method for determining the refractive index uses a method for adjusting a focus);

at least one of the following parameters is varied:

(A) distance between the optical arrangement and the sample medium;

(B) distance between the reflector and the further medium; and (C) divergence of the measurement light;

wherein the varying results in a defined distance change of a focus position of the measurement light.

The method furthermore comprises:
ascertaining a further working distance according to the method according to the invention for adjusting the focus after the varying;
ascertaining a working distance change between the working distance and the further working distance; and
ascertaining the refractive index on the basis of the distance change and the working distance change.

The device according to an embodiment of the invention for adjusting the focus comprises:
an optical arrangement for transmitting measurement light;
a reflector in the sample space, which reflector images measurement light that radiates into it and is reflected thereby onto a measurement surface or an aperture surface of a detector arrangement by way of a further optical arrangement or by way of the optical arrangement if the reflector is positioned at a working distance from the optical arrangement;
a translation module for varying the distance between the reflector and the focus of the measurement light; and
an evaluation unit that is connected to the detector arrangement for data transmission and has a working distance ascertainment module, wherein a working distance value representing the ascertained working distance is able to be output at a data output of the evaluation unit.

The device according to an embodiment of the invention for determining the refractive index of a sample medium comprises:
a device according to the invention for adjusting a focus;
a sample vessel for holding at least one sample medium, wherein the sample vessel is arranged on a sample side in the sample space of the optical arrangement;
a free beam volume for holding a further medium between the sample vessel and the optical arrangement; and
a refractive index module for determining a refractive index, which module is connected to the translation module and the working distance ascertainment module for data transmission, wherein a refractive index value representing the refractive index of the sample medium is able to be output at an output of the refractive index module.

The non-volatile computer-readable storage medium according to an embodiment of the invention solves the abovementioned problem by virtue of the fact that it comprises a program for performing the method according to an embodiment of the invention for adjusting the focus or for determining the refractive index of a sample medium.

The microscope according to an embodiment of the invention mentioned in the introductory part comprises a detection optical unit and at least one device according to an embodiment of the invention for adjusting the focus and/or for determining the refractive index of a sample medium.

The solutions according to embodiments of the invention have the advantage that, on the sample side of the optical arrangement, only the at least one medium, or additionally a further medium for determining the refractive index, is provided and said medium or said media merely need to be suitable for transmitting the measurement light. Introducing an elastically or inelastically scattering object into the beam path of the measurement light or the illumination with patterns whose imaging on a camera is evaluated with respect to the contrast, as is customary in the solutions from the prior art, is thus not necessary.

In the methods and devices according to embodiments of the invention, the working distance is defined in that the reflected measurement light therefor (in the case that the measurement light reflected by the reflector is transmitted back through the optical arrangement) is focused on the reflector and the reflected measurement light is imaged onto the measurement surface or aperture surface of the detector arrangement by way of the optical arrangement.

In the case that a further optical arrangement is used, the focus of the measurement light can be spaced apart from the reflector at the working distance. However, the reflected measurement light is in this case, too, imaged onto the measurement surface or the aperture surface of the detector arrangement.

This has the advantage that very fast detectors with a small measurement surface (the reading speed of the detectors is inversely proportional to the measurement surface) can be used. They require very little quantities of light. Image recording by way of large-surface two-dimensional CCD or CMOS sensors is consequently not necessary.

However, in a further embodiment, the variation of the size of the detector surface illuminated by the measurement light can be used for the measurement. The size can be minimum for the working distance in particular for the case that the optical arrangement and the further optical arrangement are identical.

The methods according to embodiments of the invention, the devices, the non-volatile computer-readable storage medium according to embodiments of the invention and the microscope according to embodiments of the invention can be further improved by further embodiments that are each advantageous by themselves. Technical features of the individual embodiments can here be combined as desired and/or be omitted if the technical effect achieved by the omitted technical feature is not essential.

The use of the singular or plural should not be understood to limit the scope of protection that is intended and is defined only by the claims. A medium or a further medium is understood to be an optical or a further optical medium, for example all immersion media that are known from the prior art and are customary in microscopy such as water, glycerol, culture media, etc.

In the method according to an embodiment of the invention with respect to the focus position, the intensity of the light imaged onto the detector can depend on the distance of the reflector from the optical arrangement or the distance between the reflector and the focus of the measurement light.

In a further embodiment, the measurement light reflected by the reflector can be transmitted back through the optical arrangement. In other words, in the corresponding embodiment of the device according to the invention, the optical arrangement and the further optical arrangement can be identical, with the result that the optical arrangement is used for transmitting the measurement light in two opposite directions.

The measurement light can thus be transmitted through an optical arrangement on the reflector and, after reflection, can be transmitted to the detector through a further optical arrangement. In this case, the optical arrangement and the further optical arrangement are separate, independent optical units. The embodiment of the device with a separate optical arrangement and further optical arrangement can be combined as desired with the technical features of the embodiment with an optical arrangement that is used together as illumination and detection optical unit. A repeat description of this combination will be dispensed with for reasons of clarity.

In particular, the measurement light can be transmitted through at least two optical media. Due to the reflection at the reflector, the measurement light is transmitted twice through the two optical media. In this case, one of the optical media can represent the sample medium, the refractive index of which can be unknown. Furthermore, the further optical medium can have a known or unknown refractive index. The method for adjusting the focus is likewise usable for any desired number of optical media of different refractive index between the optical arrangement and the reflector. It is likewise conceivable that a refractive index gradient exists between the optical arrangement and the reflector or that the medium has a spatially inhomogeneous refractive index.

The sample space can be defined in particular by a sample vessel, in particular a cuvette. The optical arrangement is to be understood to be a system that comprises at least one optical unit such as a lens or a curved mirror.

The measurement light can be generated on an illumination side of the optical arrangement, be transmitted through the optical arrangement, and be focused thereby on the sample side.

The reflector reflects at least some of the incident measurement light, which after the reflection propagates substantially at an angle with respect to or counter to its original propagation direction in the direction of the light source and is focused by the further optical arrangement.

The reflected measurement light can be incident on the illumination side of the optical arrangement preferably onto an optical element that spatially separates at least some of the reflected measurement light from the incoming measurement light. In other words, the beam paths of the incoming measurement light and of the reflected measurement light can be collinear, wherein both beam paths are separated by (and at) the above-described optical element. Possible embodiments of the optical element are beam splitters and optical devices based on polarization, such as polarizing beam splitters. The latter require changing polarization by way of the reflection.

The detector arrangement used can be point-shaped detectors based in particular on the photo effect. It is likewise possible that a pinhole is arranged between the detector and the optical arrangement, in particular directly in front of the detector.

Likewise, the detector can be configured to be a surface detector, wherein the detector can preferably output a signal that uniquely relates to the lateral extent of the reflected measurement light that is incident on the detector.

For example, the quantity of light that is incident on a detector behind a pinhole is maximum if the incident light (the reflected measurement light) is focused exactly in the plane of the pinhole and greatly decreases if the focus is located in front of or behind the pinhole.

The working distance can preferably correspond to an actual working distance, so that, after setting the working distance, the focus of the microscope can be adjusted onto the sample volume or the sample plane to be investigated. The working distance can, however, be related via a previously known unique functional relationship to the actual working distance. That is to say that for example merely an offset exists between the working distance and the actual working distance, and the actual working distance can be easily ascertained or calculated from the working distance.

The actual working distance of the optical system is to be understood to be the distance that is measured between a front, sample-side end of the optical arrangement and a sample-side focus of the incoming light.

If the reflector is located at the working distance, that is to say that the reflector is arranged at a working distance from the front end of the optical arrangement, the focus of the measurement light, i.e. the focal plane of the measurement light, is likewise located on the reflector. In this arrangement, depending on the embodiment of the detector arrangement, the plane of the aperture or the surface of the detector is located in a plane conjugate to the focal plane (the plane in which the reflector is arranged).

In the case of the embodiment with the further optical arrangement that is not identical to the optical arrangement, it is also possible that the focus or the focal plane is embodied to be situated spaced apart from the reflector at the working distance. In this embodiment, the working distance is defined by virtue of the fact that the focus is located in a plane that is conjugate to the detector/aperture plane.

In the arrangement having only one optical arrangement, the light coming from the reflector is imaged sharply onto the plane of the aperture or the surface of the detector. If the focus of the measurement light is located on the reflector, this corresponds to a point-shaped light source, which is ideally (on the basis of geometric beam propagation without imaging aberrations) imaged in the shape of a point in the plane of the aperture or on the surface of the detector.

In a microscope, the method according to an embodiment of the invention or the device according to an embodiment of the invention is particularly advantageous if an optical medium having an unknown refractive index is present in the sample volume of the microscope. The unknown refractive index can lead to a variation in the position both of the illumination light and the position of a detection plane. This in turn can result in blurred imaging. This is not desirable and can be prevented by the present invention.

In the device according to an embodiment of the invention, the translation module varies the distance between the reflector and the focus of the measurement light, wherein an incident quantity of light that depends on the distance of the focus from the reflector is measured by the detector during said variation. In the embodiment in which the optical arrangement and the further optical arrangement are identical, the quantity of light that passes for example through a pinhole and can be represented by an intensity value is maximum if the detector and the reflector are located in mutually conjugate planes, i.e. if the reflector is arranged in the focus of the measurement light, i.e. at the working distance. As the distance of the focus from the reflector increases, the intensity value decreases. It should be noted here that for relative values of the distance, the folding of the beam path is irrelevant. In other words, the measurement light can be focused at a specific distance x in front of the reflector, or can be reflected first and then form the focus at the distance x after the reflecting, wherein in both cases the intensity values detected with the detector are substantially identical.

In another embodiment, the surface area illuminated on a detector can be ascertained, wherein the latter is minimum for the working distance and increases as the distance of the focus from the reflector increases.

The working distance value that is able to be output at the data output of the evaluation unit can preferably be ascertained from a plurality of intensity values.

In an embodiment of the method according to the invention, the ascertaining of a working distance comprises the ascertaining of an extreme value of a variable detected by the detector arrangement. That is to say that an intensity value of the detector can be ascertained or plotted as a function of the distance between the reflector and the focus of the measurement light, and the extreme value can be ascertained from such a dataset.

The extreme value can be, in dependence on the detector used, a maximum value (if a pinhole is used) or a minimum value (illuminated detector surface).

In a further embodiment of the method according to the invention, the ascertaining of the extreme value can comprise in particular adapting parameters of a previously defined function to at least N measurement values of the detected variable, wherein N corresponds to the number of the parameters of the previously defined function.

In other words, it is possible to postulate or define in advance a function that is obtained if the pinhole or the point-shaped detector or a detector measuring the cross section of the beam or the position thereof is moved along or counter to the propagation direction of the reflected measurement light. Such a function can be, for example, Gaussian. The respectively postulated function can be defined, in addition to the function value and the variables, by the number N parameters, wherein the Gaussian function for example has only two parameters, the position of the maximum and the full width at half maximum, i.e. N in this case is two.

In the method according to an embodiment of the invention it is thus possible, with the assumption of a Gaussian function, for only two intensity values of the detector for mutually differing distances between the focus of the measurement light and the reflector to be necessary in order to ascertain the parameters of the Gaussian function via an adaptation, i.e. a mathematical fit. Of particular interest here is the position of the maximum because it allows for conclusions relating to the working distance to be drawn.

In a corresponding embodiment of the device, the variation of the distance between the focus of the measurement light and the reflector is brought about by the translation module, an intensity value that is dependent on the intensity of the incident reflected measurement light in the detector is output and preferably processed in a fitting module. In the fitting module, adaptation to the previously postulated expected function is carried out. The fitting module can provide parameter values at at least one output that represent the ascertained parameters. It is possible to infer the working distance from that parameter value representing the position of the maximum.

It is not absolutely necessary in this embodiment that the ascertained intensity values are located on both sides of the maximum. An adaptation to the postulated function can be carried out already by way of the necessary number of measured intensity values of a rising or falling edge of the function. The function can be analytically derived, but can also represent an empirical relationship ascertained by way of a measurement series.

In particular, ascertaining the working distance can be performed with an almost arbitrary distance of the focus of the measurement light from the reflector, wherein this distance does not need to correspond to the working distance.

In a further embodiment of the method according to the invention, the method can further comprise setting the ascertained working distance, wherein the setting can be carried out by way of at least one of the following method steps:
  displacing the reflector along an optical axis of the optical arrangement;
  displacing the optical arrangement along the optical axis; or
  varying the divergence of the measurement light for displacing the focus of the measurement light along the optical axis.

In a corresponding device according to an embodiment of the invention, the translation module can consequently comprise at least one module from the group consisting of:
  i. a displacement module for varying a distance between the optical arrangement and the sample medium;
  ii. a displacement module for varying a distance between the reflector and the further medium; and
  iii. a divergence module for varying the divergence of the measurement light.

This has the advantage that it is possible to define, on the basis of factors such as inertia of the elements, influencing of a sample by the movement and the like, the elements that are moved. In the case of (iii), a movement of the elements may be dispensed with.

The displacement modules can be configured in the form of translation stages or piezo actuators. In the divergence module, the convergence or the opening angle of the measurement light beam can be varied in a targeted manner to change the position of the focus of the measurement light by a specific value. Possible embodiments of the divergence module comprise phase plates that can be introduced into the beam path and can have for example an $r^2$ thickness profile in the collimated beam path. Likewise usable are concave lenses having a relatively low refractive power, i.e. a large focal length. Glass plates with plane-parallel surfaces can also be used in the focused beam path.

With particular preference, the divergence module permits a displacement of the focus of the measurement light along the optical axis of the optical arrangement by a few hundred micrometers or a few millimeters, for example, and, without limitation, by 2 mm (measured in air purely by way of example). Such a focus offset corresponds to the distance by which the optical arrangement or the reflector would have otherwise been displaced.

The embodiments of the method according to the invention or the device according to embodiments of the invention for determining the refractive index utilize the method according to embodiments of the invention for adjusting the focus or are based on the device for adjusting the focus.

In these embodiments of the method and of the device, the sample medium arranged in the sample space is arranged with at least one further medium between the reflector and the optical arrangement. The sample medium can be provided here in a defined sample volume, and the further medium can be provided in a defined free beam volume. With particular preference, the further medium comprises air, the refractive index of which is known and can be assumed to be approximately 1.000292.

After a working distance has been ascertained in the method, i.e. a working distance value representing the ascertained working distance was output at the data output of the evaluation unit:
  the distance between the optical arrangement and the sample medium is varied by way of the displacement module, or
  the distance between the reflector and the further medium is varied by way of a further displacement module, or
  the position of the focus of the measurement light is varied by changing the divergence of the measurement light by way of the divergence module, wherein each of the method steps results in the position of the focus of the measurement light or the position of the reflector being displaced by a defined distance.

Here, in contrast to the method for adjusting the focus, not only is the focus displaced, but the relative proportion in the working distance of the partial path distances in the optical medium and in the further optical medium is changed. Consequently, the effective or actual working distance of the objective is changed during focusing by way of at least one first medium (the further optical medium) in at least one second (sample) medium (the optical medium).

After this change in position, the further working distance is ascertained according to the method according to an embodiment of the invention for adjusting the focus, wherein ascertaining the further working distance can preferably comprise:

in the case of the varying in accordance with option (A), varying a distance between the reflector and the further medium and/or varying the divergence of the measurement light;

in the case of the varying in accordance with option (B), varying a distance between the optical arrangement and the sample medium and/or varying the divergence of the measurement light; and in the case of varying in accordance with option (C), varying a distance between the optical arrangement and the sample medium and/or varying a distance between the reflector and the further medium.

That means that in the case of a change in position of the reflector, before the ascertainment of the further working distance, either the optical arrangement is moved or the position of the focus of the measurement light is changed for this ascertainment by varying the divergence of the measurement light.

In other words, for ascertaining the further working distance, not the same variable that leads to the defined distance change of the focus position of the measurement light is varied.

The corresponding device connects the translation module and the working distance ascertainment module for data transmission to the refractive index module, so that a working distance value is present at the refractive index module alternatively or additionally for output at the data output of the evaluation unit. Likewise, a translation value provided by the translation module is present at the refractive index module. Furthermore, a controller can be provided that establishes a data link between said modules. In particular, a storage module can be provided, in which a translation value and an associated working distance value can be stored. Furthermore, the controller or the working distance ascertainment module can also be connected bidirectionally to the translation module and make controlling of at least one displacement module possible by way of this connection. In particular, the ascertained working distance can be set via said data link. The data link can be wire-bound or wireless.

In a further embodiment of the method according to the invention, the measurement light is reflected at one of the following elements:

a reflective surface of a body arranged in the sample space; and/or an interface, oriented substantially perpendicularly to a propagation direction of the measurement light, of a sample arranged in the sample space, wherein Fresnel reflection occurs at the interface.

In one embodiment, the reflective surface can be formed on a detection optical unit of a microscope, in particular of a confocal or light sheet microscope, i.e. the reflector can, in a corresponding embodiment of the microscope according to the invention, in particular a confocal microscope or light sheet microscope, comprising a detection optical unit and a device according to an embodiment of the invention, be attached to the detection optical unit.

In particular, the body that provides the reflective surface can be attached to the detection optical unit.

In a further embodiment of the microscope according to the invention, the optical arrangement can be configured as an illumination objective of the microscope, can provide illumination light in a sample space and can be designed to perform a focus adjustment and/or determination of the refractive index. Here, in a further embodiment of the microscope according to the invention, the illumination light can be the measurement light for adjusting the focus and/or for determining the refractive index.

The non-volatile computer-readable storage medium according to an embodiment of the invention can be an optical, magnetic, or flash-memory-based storage medium.

Embodiments of the invention will be explained in more detail below with reference to exemplary embodiments illustrated in the appended figures. Here, individual technical features of the different embodiments can be combined as desired and/or omitted. Identical technical features and technical features having identical technical function are provided with the same reference sign for the sake of clarity. A repeat description of previously illustrated and described facts is dispensed with. The illustrated embodiments are to be understood to be purely exemplary and do not limit the intended scope of protection that is defined by the claims.

FIG. 1 shows a microscope 1 that is designed as a confocal microscope 3 or light sheet microscope 5. The microscope 1 comprises an optical arrangement 9 that is designed as an illumination objective 7, transmits illumination light 11 from an illumination side 13 of the illumination objective 7 to a sample side 15 of the illumination objective 7, and focuses the illumination light 11 in a sample space 17 illustrated by a dashed line.

A focus 19 is formed inside a sample 21, wherein the sample 21 is located in a sample vessel 25 filled with immersion liquid 23.

The immersion liquid 23 can be understood to be the sample medium 27, having a refractive index n.

An optical system 29, comprising the optical arrangement 9, the sample vessel 25, and the sample medium 27 contained therein, is influenced by the refractive index n of the sample medium 27 to the effect that a spatial position 31 of the focus 19 can vary for different refractive indices n.

The illumination light 11 on the sample side 15 of the optical arrangement 9 travels through a free beam volume 33, which is indicated by a dotted line.

An optical medium 35, which in the free beam volume 33 in the example shown is air 37 is located both in the free beam volume 33 and in the sample vessel 25, and the sample medium 27 is located in the sample vessel 25.

The air 37 in the free beam volume 33 corresponds to a further optical medium 39, having the refractive index $n_1$. The sample medium 27 has the refractive index $n_2$, and the sample 21 has the refractive index $n_3$. All refractive indices $n_1$-$n_3$ can differ from one another.

The microscope 1 shown in FIG. 1 furthermore comprises a detection optical unit 41, which is known from the prior art and is therefore not described in detail.

In the adjusted state 43, the focus 19 of the illumination light 11 lies along an optical axis 53 exactly in a focal plane 45 of the detection optical unit 41 and along the illumination direction (parallel to the focal plane 45) centrally in the image field. Owing to changes in the refractive index n, deviations from the adjusted state 43 may occur, with the result that no sharp imaging can be achieved anymore with the microscope 1.

In particular, the microscope 1 shown in FIG. 1 is usable both as a confocal microscope 3 and as a light sheet microscope 5. For the use as a light sheet microscope 5 (this is shown in FIG. 1), the microscope 1 has a reflective surface 47 of a body 49 arranged in the sample space 17, wherein the body 49 is arranged on and attached to a detection objective 51 of the detection optical unit 41. The body 49 thus constitutes a reflector 55.

In addition to the inclined reflective surface 47 at which the illumination light 11 is reflected in FIG. 1, the body has a further reflective surface 47, which is oriented substantially perpendicularly to an optical axis 53 of the optical arrangement 9 and of the detection objective 51. In the embodiment shown in FIG. 1 of the microscope 1, the optical axes 53 of the optical arrangement 9 and of the detection objective 51 coincide, and in other embodiments they can be arranged parallel to one another (see 2a and 2b).

FIGS. 2a and 2b each schematically illustrate a microscope 1 according to an embodiment of the invention.

Both embodiments of the microscope 1 will be described initially with respect to their differences and, afterwards, the common technical features between the embodiments will be discussed.

The embodiments of FIGS. 2a and 2b differ in terms of the spatial position 31 of the optical axes 53 of the optical arrangement 9 and the detection optical unit 41. FIG. 2a furthermore shows a sample vessel 25 with the sample medium 27. Consequently, both the sample medium 27 and the further optical medium 39 are located in the sample space 17 (respectively shown in FIG. 2a in dashed lines), whereas only one optical medium 35 is located in the sample space 17 of FIG. 2b. This can be for example the sample medium 27 or the further optical medium 39.

Both embodiments have a detector arrangement 57, which comprises in each case one aperture 59 in the form of a pinhole 61, and a detector 63.

FIGS. 2a and 2b show that the spatial position 31 of the detector arrangements 57 with respect to the optical axis 53 of the optical arrangement 9 differ for the two embodiments shown. This is due to the fact that measurement light 65 extends non-collinearly in FIG. 2a and collinearly in FIG. 2b through the optical arrangement 9.

The embodiments of FIGS. 2a and 2b furthermore differ in that FIG. 2a shows the preferred setup of a confocal microscope 3, and FIG. 2b shows the preferred setup of a light sheet microscope 5.

Both embodiments of the microscope 1 have a light source 67, which radiates measurement light 65, in particular incoming measurement light 65a, onto an optical element 69, wherein the latter deflects the incoming measurement light 65a onto a propagation path 71.

The incoming measurement light 65a is focused in both embodiments at the reflective surface 47 of the reflector 55, that is to say the focus 19 of the measurement light 65 is located on the reflector 55. As already described above, the focus 19 of the measurement light 65 is located on the reflector 55 merely in the embodiment shown. In FIG. 2c, a further possible embodiment is shown in which the focus 19 is not located on the reflector 55.

The reflector 55 reflects the incoming measurement light 65a, wherein reflected measurement light 65b travels back through the optical arrangement 9 and through the optical element 69 along substantially the same propagation path 71.

The optical element 69 can be designed as a beam splitter 73 or a polarizing beam splitter 75 and generally be referred to as beam combiner 77.

Only reflected measurement light 65b propagates downstream of the beam combiner 77 in the direction of the detector arrangement 57.

In the two embodiments of FIGS. 2a and 2b, the reflector 55 is located at a working distance 79 of the optical arrangement 9, wherein the working distance 79 is characterized in that the focus 17 of the measurement light 65 is located on the reflector 55. This is not the case in the embodiment of FIG. 2c. The working distance 79 denotes a distance 81 measured between the focus 19 of the measurement light 65 and a front end 83, facing the sample side 15, of the optical arrangement 9. Said working distance 79 depends on the optical media 35 located in the sample space 17.

The working distance 79 in the embodiment shown corresponds to an actual working distance 80, which defines the position of the nominal focal plane of the optical units used.

In order to achieve the state shown in FIGS. 2a and 2b (reflector 55 is located at the working distance 79 of the optical arrangement 9), both the optical arrangement 9 and the detection optical unit 41 have a translation module 87, which is designed as a displacement module 88, which permits translation 89 along the optical axis 53 of the optical arrangement 9 or the detection optical unit 41. The translation 89 is indicated by way of an arrow.

FIG. 2c is a further embodiment of the microscope 1, which differs from the embodiments shown in FIGS. 2a and 2b in terms of the position of the beam splitter 73. This position of the beam splitter 73 is preferred because it is inserted in a region of the beam path in which the light propagates substantially parallel. It can furthermore be seen that, in this embodiment, the reflected measurement light 65b is exactly incident on the detector 63 through the aperture 59 or the pinhole 61 when the focus 19 of the incoming measurement light 65a that is reflected by the reflector 55 at the reflective surface 47 is spaced apart from the reflective surface 47 by an offset 66.

Figure 2C:
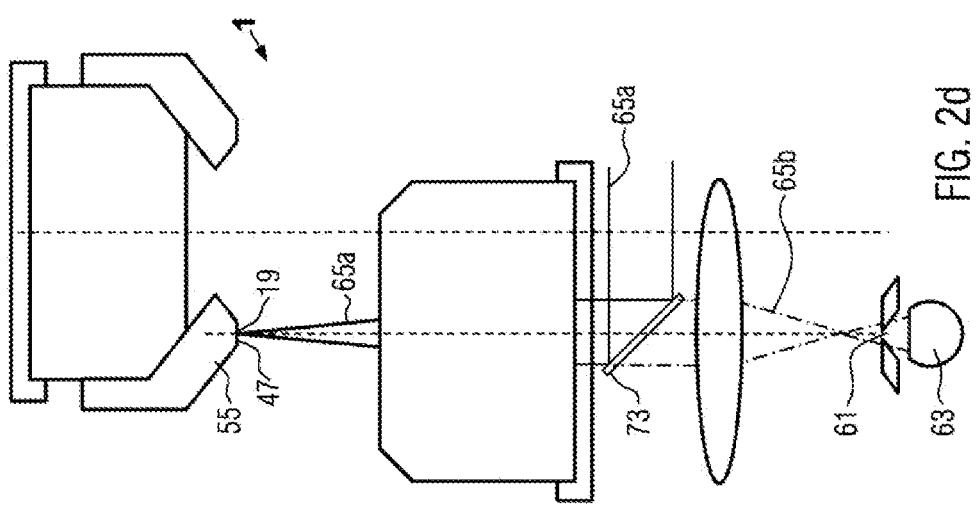

FIG. 2d shows the case where the focus 19 of the incoming measurement light 65a lies on the reflective surface 47 of the reflector 55. In this case, the reflected measurement light 65b transmitted through the beam splitter 73 is not imaged exactly on the pinhole 61. A signal of the detector 63 is thus smaller than in the case of the arrangement of FIG. 2c.

FIGS. 3a and 3b show a schematic illustration of the device 85 according to an embodiment of the invention for determining the refractive index n.

The device 85 comprises the optical arrangement 9, which can perform the translation 89 by way of the translation module 87, the reflector 55 that images reflected measurement light 65b on a measurement surface 91 (see FIGS. 2a and 2b) of the detector arrangement 57 by way of the optical arrangement 9 when the reflector 55 is positioned at the working distance 79 from the optical arrangement 9. In this embodiment, the optical arrangement 9 is identical to a further optical arrangement 9a.

A distance 93 between the reflector 55 and the focus 19 of the measurement light 65 can be varied by way of at least one of the translation modules 87.

A schematic illustration in FIG. 3a shows the case in which the focus 19 of the measurement light 65 is spaced apart from the reflector 55, and the distance 93 between the reflector 55 and the focus 19 of the measurement light 65 can be measured.

The device 85 furthermore comprises an evaluation unit 95, which is illustrated in detail only for the device 85 of FIG. 3*b*. The evaluation unit 95 is able to transmit data, i.e. is connected to the detector arrangement 57 (which is illustrated merely schematically by way of a rectangle), a working distance ascertainment module 99 and a refractive index module 101 for the determination of the refractive index n via data lines 97, wherein the refractive index module 101 is connected for data transmission to the translation module 87 or the translation modules 87 and the working distance ascertainment module 99, wherein this link is implemented centrally via a controller 103. In other embodiments, the refractive index module 101 can be connected directly to the translation modules 87.

Furthermore, the working distance ascertainment module 99 is also connected to the translation modules 87 via the controller 103.

Both the working distance ascertainment module 99 and the refractive index module 101 have a data output 105.

The evaluation unit 95 can furthermore comprise a storage unit 107, in which for example a previously defined function 109 or measurement values 111 have been or can be stored.

The reflector 55 of FIGS. 3*a* and 3*b* is located at a distance 113 from the interface between the optical medium 35 and the further optical medium 39 (in this case air 37). For the sake of simplicity, a wall 115 of the sample vessel 55 is considered to be infinitesimally thin and is not taken into account.

The optical arrangement 9 is located at a distance 117 from the sample medium 27 (the wall 115 is not taken into account here either).

Substantially, the state of FIG. 3*b* can be obtained from the state of FIG. 3*a* by:
a) increasing the distance 117 between the optical arrangement 9 and the sample medium 27 and then moving the translation module 87 of the detection optical unit 41 to follow the optical arrangement 9; or
b) reducing the distance 113 between the reflector 55 and the further optical medium 39 and subsequently moving the optical arrangement 9 away from the reflector 55 by way of the translation module 87.

The case a) is shown in FIG. 3*a* by way of the detail 119. It can be seen here that the varying of the distance 117 between the optical arrangement 9 and the sample medium 27 leads to a fixed, i.e. measurable distance change 121 of a focus position 123 of the measurement light 65.

In FIG. 3*a*, the reflector 55 is located at the working distance 79 of the optical arrangement 9, while in FIG. 3*b*, at least one parameter 125, comprising the distance 113 and the distance 117, was varied to set a further working distance 127.

The working distance 79 of FIG. 3*a* and the further working distance 127 of FIG. 3*b* are transmitted in the form of a working distance value 131 (represented schematically by an electric signal) from the working distance ascertainment module 99 to the controller 103, wherein the controller calculates, via a computation module, a working distance change 129 from the working distance value 131 of the working distance 79 and the working distance value 131 of the further working distance 127, which working distance change 129 is transmitted to the refractive index module 101 in the form of a working distance change value 133. The controller 103 furthermore ascertains the distance change 121 based on the data-transmitting connection to the translation modules 87 and transmits it in the form of a distance change value 135 to the refractive index module 101. The distance change value 135 is shown schematically in FIG. 3*b* purely by way of example for differentiation purposes in the form of triangular pulses.

Based on the working distance change value 133 and the distance change value 135, the refractive index module 101 calculates the refractive index n or a measurement value that is proportional to the refractive index n and makes it available at the data output 105 in the form of a refractive index value 137. The refractive index value 135 is illustrated schematically by way of a sine wave for differentiation purposes.

Figures 4A, 4B:
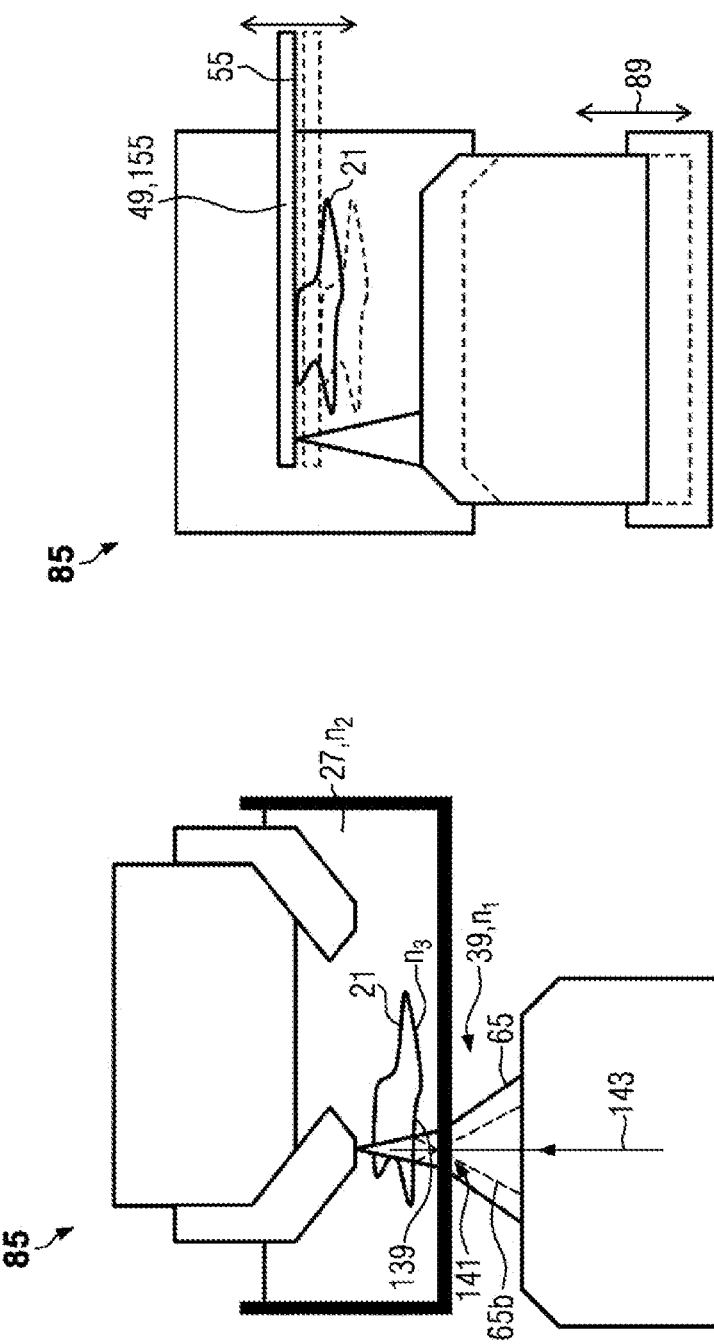
FIG. 4a and FIG. 4b show schematic illustrations of further embodiments of the device according to the invention.
Figure 4C:
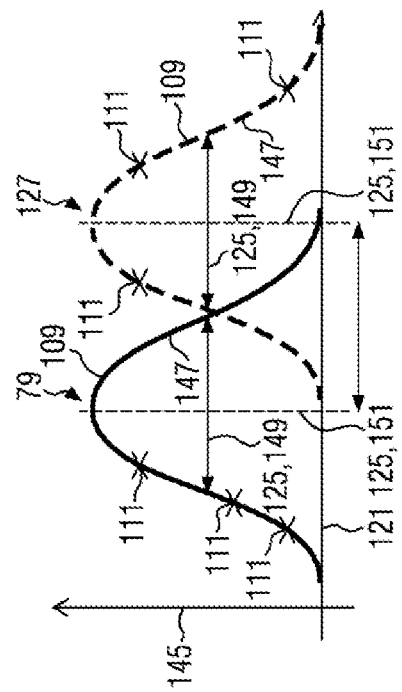
FIG. 4c shows a schematic illustration of the method according to an embodiment of the invention for adjusting the focus and for determining the refractive index.

FIG. 4*c* is intended to illustrate the ascertainment of the working distance 79. It shows a variable 145 detected by the detector arrangement 57 (such as a voltage or current), which is shown as a function of the distance change 121 both for the working distance 79 and for the further working distance 127. More specifically, FIG. 4*c* shows in each case the previously defined function 109 adapted to the measurement values 111, wherein the previously defined function 109 is illustrated by a Gaussian function 147.

The Gaussian function 147 has merely two parameters 125, specifically a full width at half maximum 149 and a center 151, wherein the center is located at an extreme value 153 of the Gaussian function 147. For the Gaussian function 147, the number N of parameters 125 is two. If other previously defined functions 109 are used, the number of necessary measurement values 111 corresponds to the number N of parameters 125 of the used function 109.

FIGS. 3*c* and 3*d* show an embodiment of the device 85 according to the invention, which comprises both the optical arrangement 9 and the further optical arrangement 9*a*. This arrangement is shown merely by way of example.

The reflector 55 in both embodiments has a reflective surface 47 which is inclined by 45°, such that incoming measurement light 65*a* is deflected, reflected by 90°, to the further optical arrangement 9*a*.

The principle of ascertaining the working distance 79 is shown, wherein a translation 89 of the further optical arrangement 9*a* together with the reflector 55 is implemented by the translation module 87. The translation 89 can also be implemented together with the sample vessel 25.

In a first configuration 68*a* (in it, the reflector 55 is drawn with a solid line), the optical arrangement 9 is also located in the first configuration 68*a*.

In a second configuration 68*b*, the further optical arrangement 9*a*, the sample vessel 25 and the reflector 55 are downwardly displaced, wherein the displacement of the further optical arrangement 9*a* is illustrated merely by way of a displacement of the reflected measurement light 65*b*. The displacement of the sample vessel 25 is not illustrated for the sake of clarity.

In this second configuration 68*b*, the optical arrangement 9 is displaced by way of the corresponding translation module 87 into a second configuration 68*b* illustrated in dots to ascertain the working distance 79.

It is necessary for measuring the refractive index n of the optical medium 35 that a relative distance portion of the measurement light 65 in the optical medium 35 changes.

The relative distance portion is obtained by dividing the sum of distance portions 165*a*, 165*b* in the optical medium 35 by the sum of the distance portions 165*a*, 165*b* in the optical medium 35 and distance portions 167*a*, 167*b* in the further optical medium 39.

The distance portions 165*a*, 165*b*, 167*a* and 167*b* are illustrated in FIG. 3*c* for the first configuration 68*a*.

In the second configuration 68*b*, the distance portions 165*b* and 167*b* do not change, while the distance portion 165a decreases and the distance portion 167a increases in size. The distance portions for the second configuration 68b are not shown for the sake of clarity.

FIG. 3d shows the case where the reflector 55 remains stationary at its place and the optical arrangement 9 performs a translation 89. To optimize the signal, the further optical arrangement 9a is now moved toward the sample vessel 25.

In the case shown, the distance portions 165a, 165b in the optical medium 35 remain the same, whereas the distance portion 167a increases by the difference 171 to the changed distance portion 169a. However, to set the working distance, the further optical arrangement 9a must be reduced from the distance portion 167b to the changed distance portion 169b. This reduction corresponds exactly to the difference 171.

The relative distance portion is obtained by the following calculation: $(167a+167b)/(167a+167b+165a+165b)$, wherein, in the case of the translation 89 of the optical arrangement 9 and corresponding adaptation of the further optical arrangement 9a, the relative distance portion is obtained by $(169a+169b)/(167a+167b+165a+165b)$, which means, after simplification, $((167a+171)+(167b-171))/(167a+167b+165a+165b)=(167a+167b)/(167a+167b+165a+165b)$. This expression is identical to the original relative distance portion. Displacement as shown in FIG. 3d is thus not suitable for calculating the refractive index of the medium 35.

FIGS. 4a and 4b show schematic illustrations of further embodiments of the device 85 according to the invention.

In FIG. 4a, the sample 21 is located in the measurement light 65, so that for example the refractive index $n_3$ of the sample 21 can be determined with the method according to an embodiment of the invention for ascertaining the refractive index n, provided the refractive index $n_1$ of the further optical medium 39 and the refractive index $n_2$ of the sample medium 27 and possibly the thickness thereof are known.

Furthermore, in the case of suitable refractive indexes $n_2$ and $n_3$, the sample 21 shown can also be used to perform the method according to an embodiment of the invention at an interface 139 of the sample 21 by way of Fresnel reflection 141. The measurement light 65b reflected by way of Fresnel reflection 141 is shown in dashed lines in FIG. 4a. For this purpose, the interface 139 of the sample 21 is oriented substantially perpendicularly to a propagation direction 143 of the illumination light 65.

In FIG. 4b, the reflector 55 is not located at a detection optical unit 41 but on the body 49, which can be designed for example as a cover slip 155 and on which the sample 21 is arranged and in the case of a translation 89 moves along with the cover slip 155.

Figure 5:
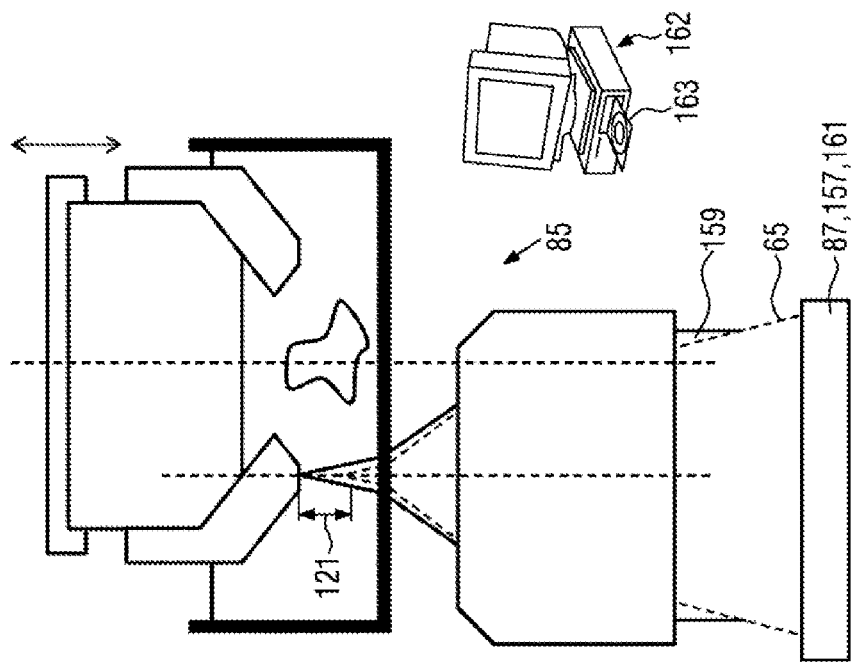
FIG. 5 shows a further embodiment of the method according to the invention for adjusting the focus and for determining the refractive index.

FIG. 5 shows a further embodiment of the method according to the invention for adjusting the focus and for determining the refractive index n, wherein, in this embodiment, the translation module 87 is designed as a divergence module 157, which can attain the distance change 121 by way of varying a divergence 159 of the measurement light 65.

This can be implemented by way of phase plates 161, lenses having relatively small refractive power, or glass plates having plane-parallel surfaces in the focused beam path.

FIG. 5 furthermore shows that the device 85 can be connected to a PC 162, which can read a non-volatile computer-readable storage medium 163 that comprises a program for performing the method according to an embodiment of the invention.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 Microscope
3 Confocal microscope
5 Light sheet microscope
7 Illumination objective
9 Optical arrangement
11 Illumination light
13 Illumination side
15 Sample side
17 Sample space
19 Focus
21 Sample
23 Immersion liquid
25 Sample vessel
27 Sample medium
29 Optical system
31 Spatial position
33 Free beam volume
35 Optical medium
37 Air
39 Further optical medium
41 Detection optical unit
43 Adjusted state
45 Focal plane
47 Reflective surface
49 Body
51 Detection objective
53 Optical axis
55 Reflector
57 Detector arrangement
59 Aperture
61 Pinhole
63 Detector
65 Measurement light 65a Incoming measurement light
65b Reflected measurement light
66 Offset
67 Light source
69 Optical element
71 Propagation path
73 Beam splitter
75 Polarizing beam splitter
77 Beam combiner
79 Working distance
80 Actual working distance
81 Distance
83 Front end
85 Device
87 Translation module
88 Displacement module
89 Translation
91 Measurement surface
93 Distance between reflector and focus of the measurement light
95 Evaluation unit
97 Data line
99 Working distance ascertainment module
101 Refractive index module
103 Controller
105 Data output
107 Storage unit
109 Previously defined function
111 Measurement value
113 Distance between reflector and further optical media
115 Wall
117 Distance between optical arrangement and sample medium
119 Section
121 Distance change
123 Focus position
125 Parameter
127 Further working distance
129 Working distance change
131 Working distance value
133 Working distance change value
135 Distance change value
137 Refractive index value
139 Interface
141 Fresnel reflection
143 Propagation direction
145 Detected variable
147 Gaussian function
149 Full width at half maximum
151 Center
153 Extreme value
155 Cover slip
157 Divergence module
159 Divergence
161 Phase plate
162 PC
163 Non-volatile computer-readable storage medium
165a, 165b Distance portion in the optical medium
167a, 167b Distance portion in the further optical medium
171 Difference
n Refractive index
$n_1$ Refractive index of the further optical medium
$n_2$ Refractive index of the sample medium
$n_3$ Refractive index of the sample

The invention claimed is:

1. A method for adjusting a focus of an optical system, the method comprising:
focusing measurement light in a sample space using an optical arrangement, wherein the measurement light is transmitted on a sample side of the optical arrangement through at least one optical medium;
detecting the measurement light reflected by a reflector and transmitted through a further optical arrangement using a detector arrangement; and
ascertaining a working distance between the optical arrangement and the reflector based on the measurement light detected by the detector, wherein a focus of the measurement light lies on the reflector for the working distance.

2. The method as claimed in claim 1, wherein the measurement light reflected by the reflector is transmitted back through the optical arrangement.

3. The method as claimed in claim 1, wherein the measurement light is transmitted through at least two optical media.

4. The method as claimed in claim 1, wherein ascertaining the working distance comprises ascertaining an extreme value of a variable detected by the detector arrangement.

5. The method as claimed in claim 4, wherein ascertaining the extreme value comprises adapting parameters of a previously defined function to at least N measurement values of the detected variable, wherein N corresponds to the number of the parameters of the previously defined function.

6. The method as claimed in claim 1, further comprising setting the ascertained working distance by at least one of the following method steps:
displacing the reflector along an optical axis of the optical arrangement;
displacing the optical arrangement along the optical axis; or
varying divergence of the measurement light for displacing the focus of the measurement light along the optical axis.

7. A method for determining a refractive index of a sample medium that is arranged in a sample space with at least one further optical medium between the reflector and the optical arrangement, the method comprising:
focusing measurement light in a sample space using an optical arrangement, wherein the measurement light is transmitted on a sample side of the optical arrangement through at least one optical medium;
detecting the measurement light reflected by a reflector and transmitted through a further optical arrangement using a detector arrangement;
ascertaining a first working distance between the optical arrangement and the reflector based on the measurement light detected by the detector, wherein a focus of the measurement light lies on the reflector for the first working distance;
varying at least one of the following parameters:
(A) distance between the optical arrangement and the sample medium;
(B) distance between the reflector and the further optical medium; or
(C) divergence of the measurement light,
wherein the varying results in a defined distance change of a focus position of the measurement light;
ascertaining a further working distance after the varying in a same manner as the ascertaining of the first working distance;

ascertaining a working distance change between the working distance and the further working distance; and ascertaining the refractive index based on the distance change and the working distance change.

8. The method as claimed in claim 7, wherein ascertaining the further working distance comprises:

in the case of the varying in accordance with option (A), varying the distance between the reflector and the further optical medium and/or varying the divergence of the measurement light;

in the case of the varying in accordance with option (B), varying the distance between the optical arrangement and the sample medium and/or varying the divergence of the measurement light; and in the case of varying in accordance with option (C), varying the distance between the optical arrangement and the sample medium and/or varying the distance between the reflector and the further optical medium.

9. The method as claimed in claim 1, wherein the measurement light is reflected in one of the following elements:

a reflective surface of a body arranged in the sample space; and/or an interface, oriented substantially perpendicularly to a propagation direction of the measurement light, of a sample arranged in the sample space, wherein Fresnel reflection occurs at the interface.

10. A device for adjusting a focus of an optical system, the device comprising:

an optical arrangement configured to transmit and focus measurement light;

a reflector disposed in a sample space and configured to reflect incoming measurement light and measurement light that is reflected thereby onto a measurement surface or an aperture surface of a detector arrangement by a further optical arrangement or by the optical arrangement in a case that the reflector is positioned at a working distance from the optical arrangement;

a translation module configured to vary a distance between the reflector and a focus of the measurement light; and an evaluation unit that is connected to the detector arrangement and configured to transmit data, the evaluation unit having a working distance ascertainment module configured to ascertain and output a working distance value representing the ascertained working distance at a data output of the evaluation unit.

11. The device as claimed in claim 10, wherein the translation module comprises at least one module from the group consisting of:

(i) a displacement module configured to vary a distance between the optical arrangement and the sample medium;

(ii) a displacement module configured to vary a distance between the reflector and the further optical medium; and (iii) a divergence module configured to vary divergence of the measurement light.

12. A device for determining a refractive index of a sample medium, comprising an optical arrangement configured to transmit and focus measurement light;

a reflector disposed in a sample space of the optical arrangement and configured to reflect incoming measurement light and measurement light that is reflected thereby onto a measurement surface or an aperture surface of a detector arrangement by a further optical arrangement or by the optical arrangement in a case that the reflector is positioned at a working distance from the optical arrangement;

a translation module configured to vary a distance between the reflector and a focus of the measurement light;

an evaluation unit that is connected to the detector arrangement and configured to transmit data, the evaluation unit having a working distance ascertainment module configured to ascertain and output a working distance value representing the ascertained working distance at a data output of the evaluation unit;

a sample vessel configured to hold the sample medium, wherein the sample vessel is arranged on a sample side in the sample space of the optical arrangement;

a free beam volume configured to hold a further optical medium between the sample vessel and the optical arrangement; and a refractive index module configured to determine and output a refractive index value representing the refractive index of the sample medium, the refractive index module being connected to the translation module and the working distance ascertainment module for data transmission.

13. A non-transitory, non-volatile computer-readable storage medium, comprising a program for performing the method as claimed in claim 1.

14. A microscope comprising a detection optical unit and the device as claimed in claim 10.

15. The microscope as claimed in claim 14, wherein the optical arrangement is designed as an illumination objective of the microscope and is configured to provide illumination light in the sample space and to perform a focus adjustment and/or determination of the refractive index.

16. The microscope as claimed in claim 15, wherein the illumination light is the measurement light for adjusting the focus and/or for determining the refractive index.

17. The microscope as claimed in claim 14, wherein the microscope is a confocal or light sheet microscope.

18. The method as claimed in claim 1, wherein the optical system is a microscope.

* * * * *